(12) United States Patent
Anderson et al.

(10) Patent No.: US 10,358,069 B2
(45) Date of Patent: Jul. 23, 2019

(54) ARMREST ASSEMBLY FOR VEHICLE INTERIOR

(71) Applicant: Shanghai Yanfeng Jinqiao Automotive Trim Systems Co., Ltd., Plymouth, MI (US)

(72) Inventors: Rick Alan Anderson, Grand Haven, MI (US); Thomas Scott Hodgson, Holland, MI (US); Randy William Nurenberg, Hudsonville, MI (US)

(73) Assignee: Shanghai Yanfeng Jinqiao Automotive Trim Systems Co., Ltd., Novi, MI (US)

( * ) Notice: Subject to any disclaimer, the term of this patent is extended or adjusted under 35 U.S.C. 154(b) by 155 days.

(21) Appl. No.: 15/610,193

(22) Filed: May 31, 2017

(65) Prior Publication Data

US 2017/0267134 A1 Sep. 21, 2017

Related U.S. Application Data

(63) Continuation of application No. PCT/US2015/065345, filed on Dec. 11, 2015.

(60) Provisional application No. 62/091,329, filed on Dec. 12, 2014.

(51) Int. Cl.
*A47C 7/62* (2006.01)
*B60N 2/75* (2018.01)

(52) U.S. Cl.
CPC ............ *B60N 2/793* (2018.02); *B60N 2/767* (2018.02)

(58) Field of Classification Search
CPC .......... B60N 2/75; B60N 2/793; B60N 2/767; B60N 2/77; B60N 2/753; B60N 2/763; B60N 2/78

USPC ........... 297/188.19, 411.35, 188.15, 188.16, 297/411.2, 411.3, 411.31, 411.37, 411.38
See application file for complete search history.

(56) References Cited

U.S. PATENT DOCUMENTS

| | | | | |
|---|---|---|---|---|
| 5,116,099 A | * | 5/1992 | Kwasnik | A47C 7/543 297/188.15 |
| 5,639,002 A | * | 6/1997 | Weitbrecht | B60R 7/04 224/539 |
| 5,845,965 A | * | 12/1998 | Heath | B60N 2/77 297/188.19 |
| 5,997,092 A | * | 12/1999 | Slaven | B60N 2/0232 297/411.36 |
| 6,045,173 A | * | 4/2000 | Tiesler | B60N 3/102 296/37.8 |

(Continued)

FOREIGN PATENT DOCUMENTS

| | | |
|---|---|---|
| CN | 101028801 A | 9/2007 |
| DE | 102007024000 A1 | 11/2008 |

(Continued)

OTHER PUBLICATIONS

U.S. Patent & Trademark Office Global Dossier for EP Patent Application No. EP 15823432.8 dated Aug. 23, 2018 (in English) (317 pages).

(Continued)

*Primary Examiner* — Chi Q Nguyen

(57) ABSTRACT

An armrest assembly for a vehicle interior is disclosed. The armrest assembly for a vehicle interior comprises a base comprising an opening, an armrest configured to move to (a) a closed position to cover the opening of the base, (2) a raised position, and (3) an open position, a mechanism configured to move the armrest from the closed position to the raised position. The mechanism may be configured to prevent movement of the armrest from the open position to the raised position.

21 Claims, 11 Drawing Sheets

(56) References Cited

U.S. PATENT DOCUMENTS

| | | | |
|---|---|---|---|
| 6,286,793 B1 | 9/2001 | Hirose et al. | |
| 6,652,032 B2 * | 11/2003 | Laval | B60N 2/793 297/411.32 |
| 7,163,248 B2 * | 1/2007 | Adams | B60R 7/04 296/24.34 |
| 7,168,750 B2 * | 1/2007 | Hutek | B60R 7/04 296/37.8 |
| 7,770,953 B2 * | 8/2010 | Koarai | B60R 7/04 296/24.34 |
| 7,878,567 B2 * | 2/2011 | Schneider | B60R 7/04 296/24.34 |
| 8,167,348 B2 * | 5/2012 | Fesenmyer | B60N 3/101 296/24.34 |
| 9,107,507 B2 * | 8/2015 | Wallis | A47C 7/54 |
| 2009/0278370 A1 * | 11/2009 | DePue | B60N 2/793 296/24.34 |

FOREIGN PATENT DOCUMENTS

| | | |
|---|---|---|
| DE | 102009007723 A1 | 8/2010 |
| DE | 102009007723 B4 | 1/2013 |
| FR | 2792590 A1 | 10/2000 |
| FR | 2792590 B1 | 10/2000 |
| FR | 2961763 A1 | 12/2011 |
| FR | 2961763 B1 | 7/2017 |
| JP | 2007261435 A | 10/2007 |
| JP | 4551348 B2 | 9/2010 |
| WO | 2014047290 A1 | 3/2014 |

OTHER PUBLICATIONS

Communication pursuant to Article 94(3) EPC from the European Patent Office for EP Patent Application No. 15 823 432.8 dated Dec. 14, 2017 (in English) (4 pages).

Response to Communication pursuant to Article 94(3) EPC from the European Patent Office for EP Patent Application No. 15 823 432.8 dated Mar. 2, 2018 (in English) (6 pages).

International Search Report and Written Opinion for International Application No. PCT/US2015/065345 dated Mar. 11, 2016.

First Office Action from the National Intellectual Property Administration, PRC for CN Patent Application No. 201580075154.X dated Jan. 23, 2019 (with English translation) (10 pages).

* cited by examiner

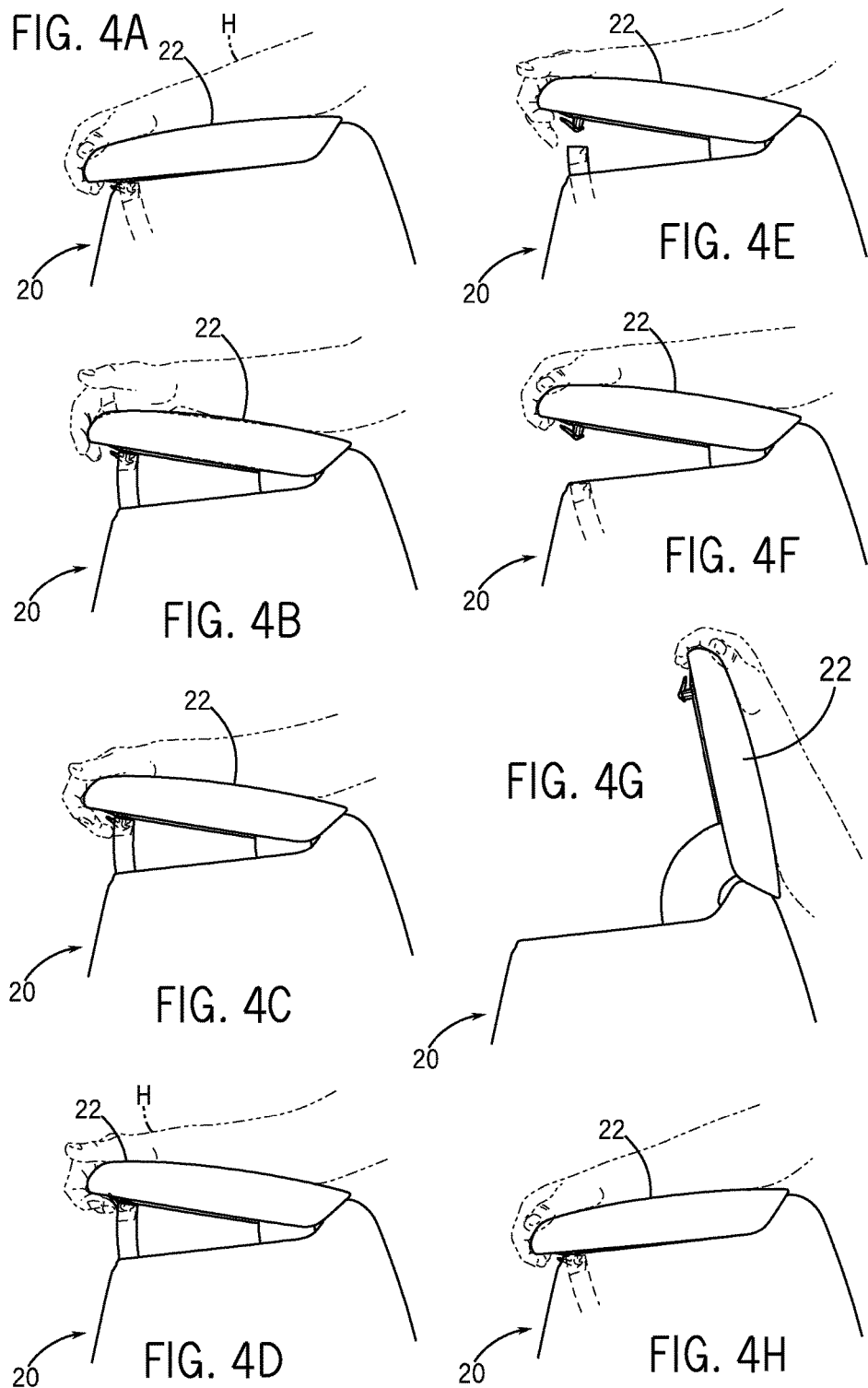

ARMREST ASSEMBLY FOR VEHICLE INTERIOR

CROSS-REFERENCE TO RELATED PATENT APPLICATION

The present application is a continuation of International Application No. PCT/US15/065345 titled "ARMREST ASSEMBLY FOR VEHICLE INTERIOR" filed Dec. 11, 2015.

The present application claims priority from and benefit of the following applications: (a) U.S. Provisional Patent Application No. 62/091,329, entitled "VERTICALLY ADJUSTABLE ARMREST ASSEMBLY FOR A VEHICLE INTERIOR COMPONENT" filed Dec. 12, 2014; (b) International Application No. PCT/US15/065345 titled "ARMREST ASSEMBLY FOR VEHICLE INTERIOR" filed Dec. 11, 2015 which are hereby incorporated by reference in their entirety.

FIELD

The present invention relates generally to an armrest assembly for a vehicle interior.

BACKGROUND

Certain vehicles include an armrest to facilitate passenger comfort. The armrest may be coupled to a vehicle seat, a door panel, and/or a floor console. The vertical position of the armrest may be adjustable to accommodate vehicle occupants of different heights and/or builds. The armrest may be configured to rotate about a pivot joint between a lowered position and a raised position. An adjustment mechanism may be employed to hold the armrest in a desired position (e.g., between the lowered position and the raised position). Certain adjustment mechanisms are integrated within the pivot joint and/or coupled to the pivot joint to selectively block rotation of the armrest when a desired armrest position is achieved. Such adjustment mechanisms may be subjected to a large torque as a vehicle occupant applies weight to the armrest. Accordingly, known adjustment mechanisms may be required to be constructed from heavy and/or expensive materials (e.g., steel) to resist the torque, thus increasing the weight and/or manufacturing cost of the vehicle.

An example of an armrest is disclosed in DE102007024000 A1. The vertical position of the armrest is adjustable, but the armrest design has numerous disadvantages. For example, the armrest has a dual latch system with a primary latch for opening the storage compartment and a secondary latch for manual height adjustment of the armrest, which may cause user confusion regarding which latch to use. The stowed position is achieved by manually holding down the latch and moving the armrest, which may be inconvenient for the vehicle occupant. The motion of the armrest is not dampened, which diminishes the user experience. The secondary latch must be engaged to adjust the armrest height. The armrest styling is compromised because the design requires a large moving shroud, which adversely impacts styling.

SUMMARY

The present invention relates to an armrest assembly for a vehicle interior. The armrest assembly may comprise a base comprising an opening; an armrest configured to move to (1) a closed position to cover the opening of the base, (2) a raised position and (3) an open position; and a mechanism configured to move the armrest from the closed position to the raised position. The mechanism may be configured to prevent movement of the armrest from the open position to the raised position. The mechanism may be configured to move from an extended position to a retracted position to prevent movement of the armrest from the open position to the raised position. The armrest may be decoupled from the mechanism in the open position. The armrest may be configured to rotate about a pivot from the closed position to the raised position; the armrest may be configured to rotate about the pivot from the raised position to the open position. The mechanism may be configured to couple the armrest to the base. The armrest may be configured to move from the closed position to the open position through the raised position. The mechanism may be configured to prevent movement of the armrest from the raised position to the closed position. The armrest assemble may comprise a latch. The latch may be configured to allow movement of the armrest from the raised position to the closed position. The base may comprise the mechanism. The mechanism may be stored in the base when the armrest is in the closed position and when the armrest is in the open position and extends from the base when the armrest is in the raised position.

The present invention also relates to an armrest assembly for a vehicle interior. The armrest assembly may comprise a base comprising an opening; an armrest configured to move to (1) a closed position to cover the opening of the base, (2) a raised position and (3) an open position; and a mechanism configured to move the armrest from the closed position to the raised position. The mechanism may be configured to move from a lowered position to an extended position to move the armrest from the closed position to the raised position. When the armrest moves from the raised position to the open position the mechanism may move from the extended position to the lowered position. The armrest may be configured to rotate about a pivot from the closed position to the raised position; the armrest may be configured to rotate about the pivot from the raised position to the open position. The armrest may be decoupled from the mechanism in the open position. The mechanism may be configured to couple the armrest to the base. The mechanism may comprise a spring configured to move the mechanism from the extended position to the lowered position and a damper configured to resist movement of the mechanism from the extended position to the lowered position. The mechanism may comprise a pawl configured to engage the base to prevent movement of the armrest from the raised position to the closed position and disengage the base to allow movement of the armrest from the raised position to the closed position and a slider configured to block movement of the pawl.

The present invention further relates to an armrest assembly for a vehicle interior. The armrest assembly may comprise a base comprising an opening; an armrest configured to move to (1) a closed position to cover the opening of the base, (2) a raised position and (3) an open position; a mechanism configured to move the armrest from the closed position to the raised position; and a latch configured to prevent movement of the armrest to the open position. The mechanism may be configured to prevent movement of the armrest from the raised position to the closed position. The mechanism may be configured to allow movement of the armrest from the raised position to the closed position in response to actuation of the latch. The mechanism may be configured to move from an extended position to a lowered position to prevent movement of the armrest from the open position to the raised position. The latch may be configured to selectively couple the armrest and the mechanism. The armrest may be configured to rotate about a pivot from the closed position to the raised position; the armrest may be configured to rotate about the pivot from the raised position to the open position. The mechanism may be configured to couple the armrest to the base when the armrest is in the closed position and the raised position.

DRAWINGS

FIG. 4A is a schematic side view of an armrest assembly with an armrest in a closed position according to an exemplary embodiment.

FIG. 4B is a schematic side view of an armrest assembly with an armrest in a raised or partially open position according to an exemplary embodiment.

FIG. 4C is a schematic side view of an armrest assembly with an armrest in a raised or partially open position according to an exemplary embodiment.

FIG. 4D is a schematic side view of an armrest assembly with an armrest in a raised or partially open position according to an exemplary embodiment.

FIG. 4E is a schematic side view of an armrest assembly with an armrest in a raised or partially open position according to an exemplary embodiment.

FIG. 4F is a schematic side view of an armrest assembly with an armrest in a raised or partially open position according to an exemplary embodiment.

FIG. 4G is a schematic side view of an armrest assembly with an armrest in a terminal or fully open position according to an exemplary embodiment.

FIG. 4H is a schematic side view of an armrest assembly with an armrest in a closed position according to an exemplary embodiment.

DESCRIPTION

Referring generally to the FIGURES, this application discloses various exemplary embodiments of armrest assemblies for use in vehicle interiors.

Figure 1A:
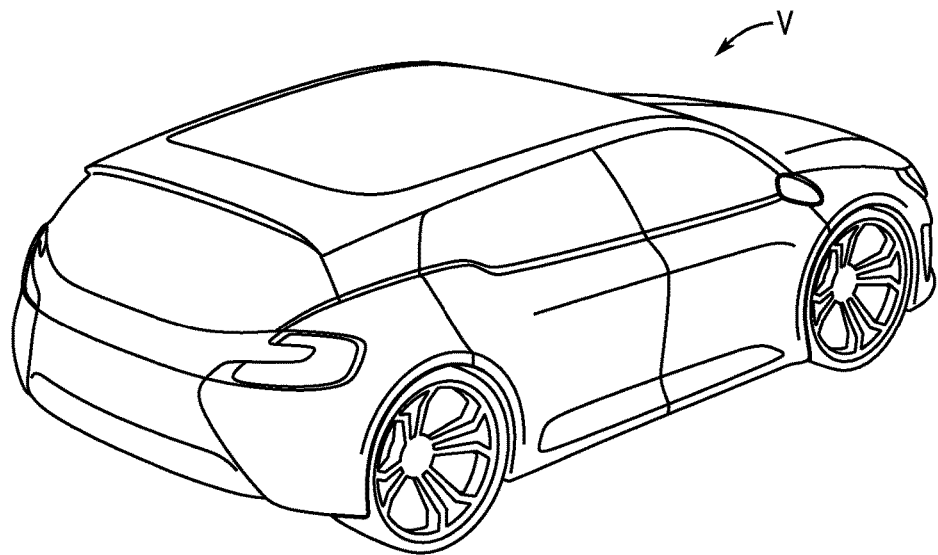
FIG. 1A is a schematic perspective view of a vehicle according to an exemplary embodiment.
Figure 1B:
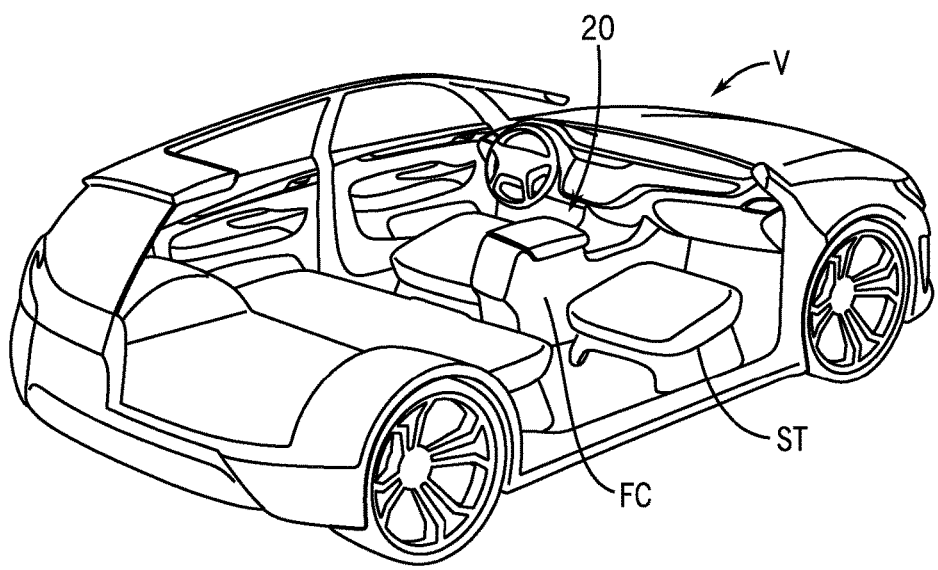
FIG. 1B is a schematic perspective cut-away view of a vehicle showing a vehicle interior according to an exemplary embodiment.

FIGS. 1A and 1B are schematic perspective views of an exemplary vehicle that may include an armrest assembly, which is preferably vertically adjustable, for a vehicle interior. According to an exemplary embodiment, the vehicle V is shown as including an interior 20 having a seat ST and a floor console FC. According to an exemplary embodiment, the floor console FC may include an armrest assembly having a base comprising an opening and an armrest configured to cover the opening of the base and configured to move from a closed position to a raised position (e.g., vertically adjustable). According to an exemplary embodiment, a mechanism may couple the armrest to the base and be configured to (a) move from a lowered position to an extended position to move the armrest from the closed position to the raised position, (b) prevent movement of the armrest from the raised position to the closed position. According to an exemplary embodiment, a latch is configured to couple the armrest and the base. According to an exemplary embodiment, the latch may be configured to release the armrest from the base and allow movement of the armrest from the raised position to at least one of (a) the closed position, (b) a terminal position. While the armrest assembly is described with reference to a floor console FC, the armrest assembly may be employed within other vehicle interior components. For example, a seat, a door panel, and/or a rear seat assembly may include an armrest configured to be raised and/or lowered to a position that facilitates driver and/or passenger comfort.

Figure 2A:
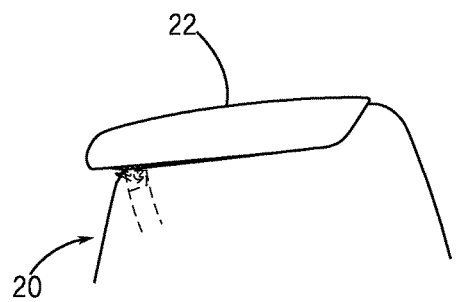
FIG. 2A is a schematic side view of an armrest assembly with an armrest in a closed position according to an exemplary embodiment.
Figure 2D:
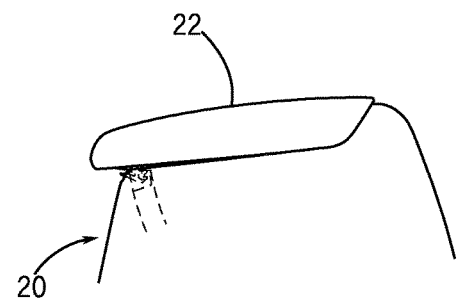
FIG. 2D is a schematic side view of an armrest assembly with an armrest in a closed position according to an exemplary embodiment.
Figure 2B:
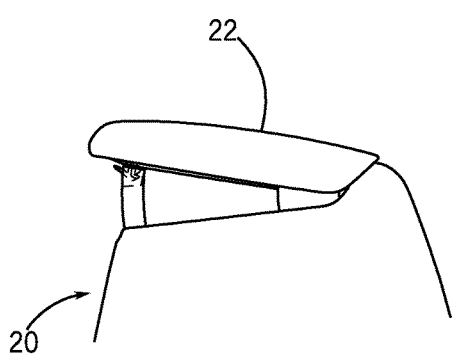
FIG. 2B is a schematic side view of an armrest assembly with an armrest in a raised or partially open position according to an exemplary embodiment.
Figure 2E:
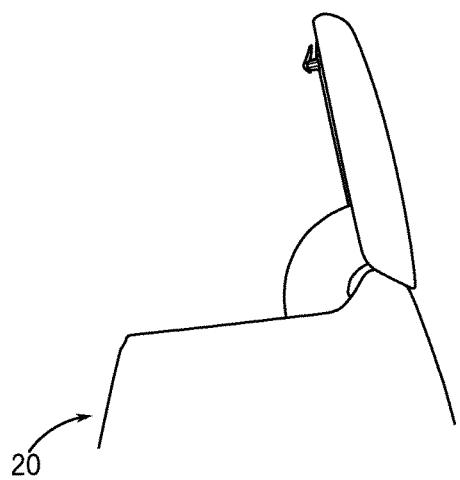
FIG. 2E is a schematic side view of an armrest assembly with an armrest in a terminal or fully open position according to an exemplary embodiment.
Figure 2C:
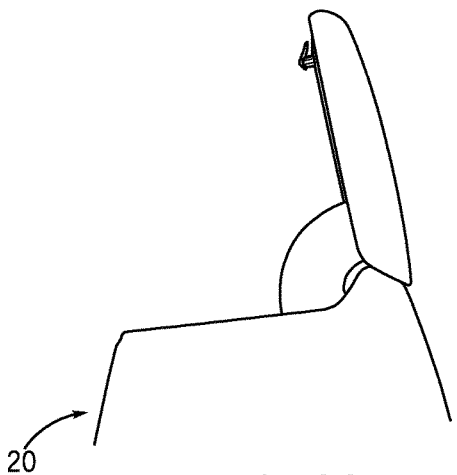
FIG. 2C is a schematic side view of an armrest assembly with an armrest in a terminal or fully open position according to an exemplary embodiment.

FIGS. 2A to 2E are schematic side views of an exemplary embodiment of an armrest assembly 20, showing certain general functionality of the armrest assembly 20. According to an exemplary embodiment, the armrest assembly 20 includes an armrest 22 configured to move between the closed or lowered position (FIGS. 2A and 2D), a raised or partially open position (FIG. 2B), and a terminal or fully open position (FIGS. 2C and 2E).

According to an exemplary embodiment, the armrest 22 may be moved (e.g., rotated) from the closed position (FIG. 2A) to a desired raised position (FIG. 2B). As shown schematically in FIG. 3B, the armrest 22 may be held in the desired raised position by a mechanism. According to an exemplary embodiment, the mechanism may hold the armrest in the raised position. According to an exemplary embodiment, the mechanism may be configured to hold the armrest 22 in one of a variety of raised or vertical positions, as desired by a vehicle occupant. The armrest 22 may also be released from the mechanism to be allowed to be moved to the terminal position (FIG. 2C). According to an exemplary embodiment, when the armrest 22 is released from the mechanism, it may retract into the base. According to an exemplary embodiment, vehicle occupant may have access to the opening or storage compartment of the base when the armrest 22 is in the terminal position.

According to an exemplary embodiment, the armrest 22 may be moved (e.g., rotated) from the closed position (FIG. 2D) and simultaneously released from the mechanism, such that the armrest 22 is allowed to be moved to the terminal position (FIG. 2E). According to an exemplary embodiment, as shown schematically in FIG. 2E (and FIG. 2C), the mechanism may remain in the base while the armrest 22 is moved. The vehicle occupant will have access to the opening or storage compartment of the base when the armrest 22 is in the terminal position.

Figure 6A:
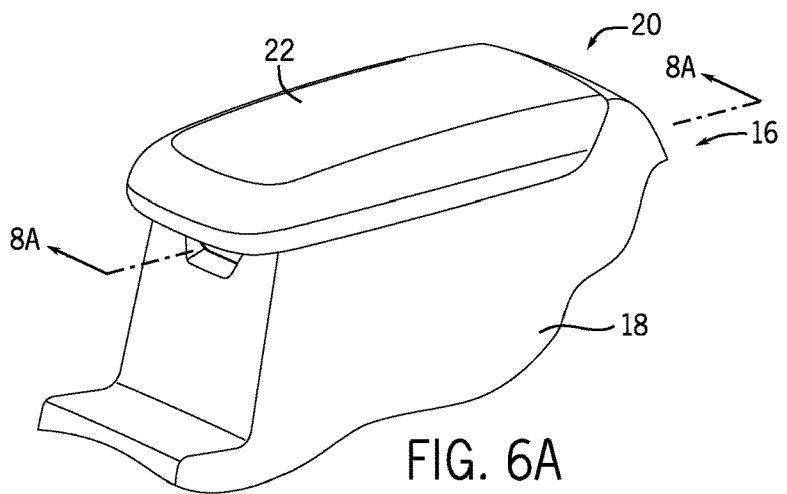
FIG. 6A is a schematic perspective view of an armrest assembly with an armrest in a closed position according to an exemplary embodiment.
Figure 6B:
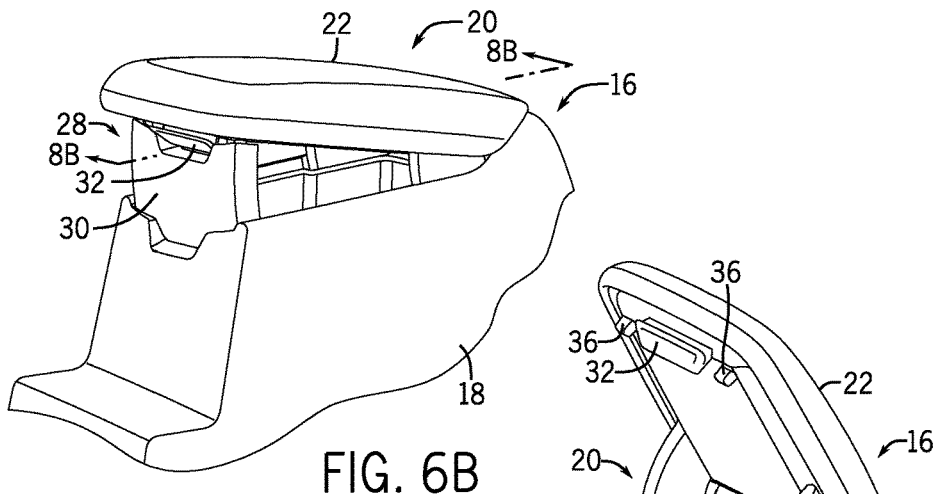
FIG. 6B is a schematic perspective view of an armrest assembly with an armrest in a raised or partially open position according to an exemplary embodiment.
Figure 6C:
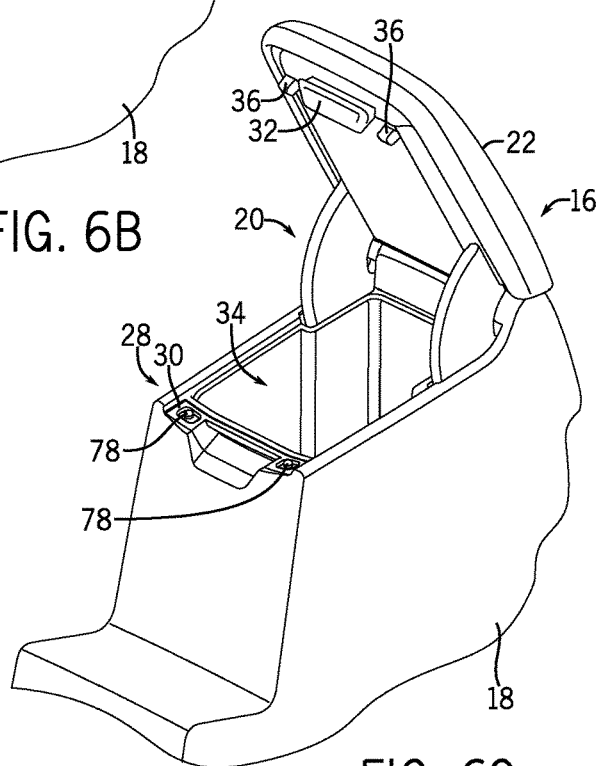
FIG. 6C is a schematic perspective view of an armrest assembly with an armrest in a terminal or fully open position according to an exemplary embodiment.
Figures 7A, 7B:
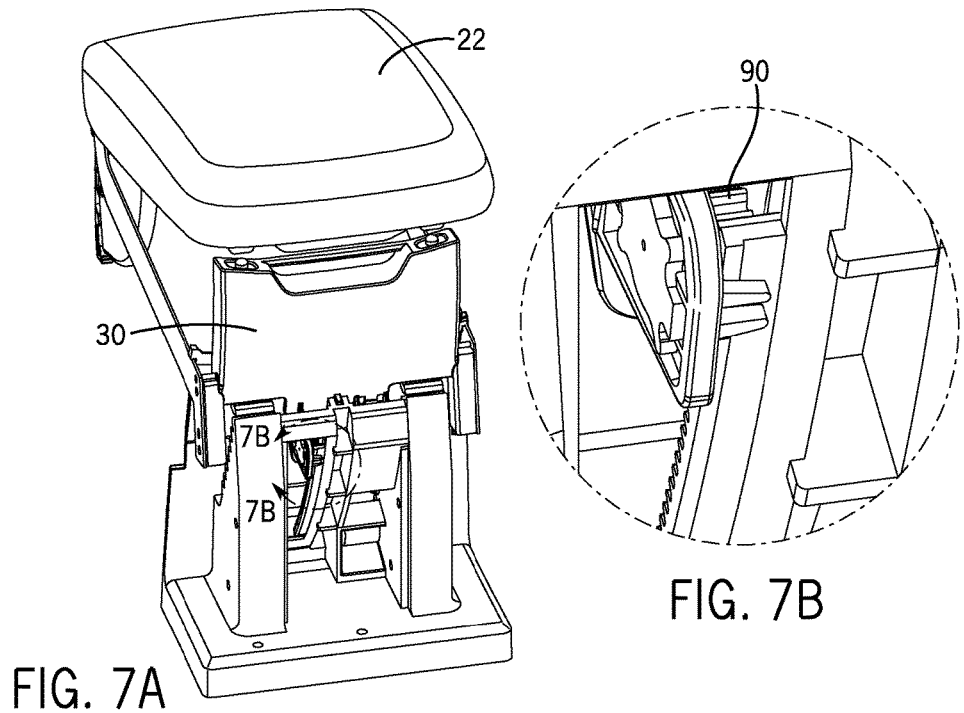
FIG. 7A is a schematic perspective view of an armrest assembly with an armrest in a raised or partially open position and according to an exemplary embodiment.
FIG. 7B is a schematic detail perspective view of a portion of an armrest assembly according to an exemplary embodiment.
Figures 7C, 7D:
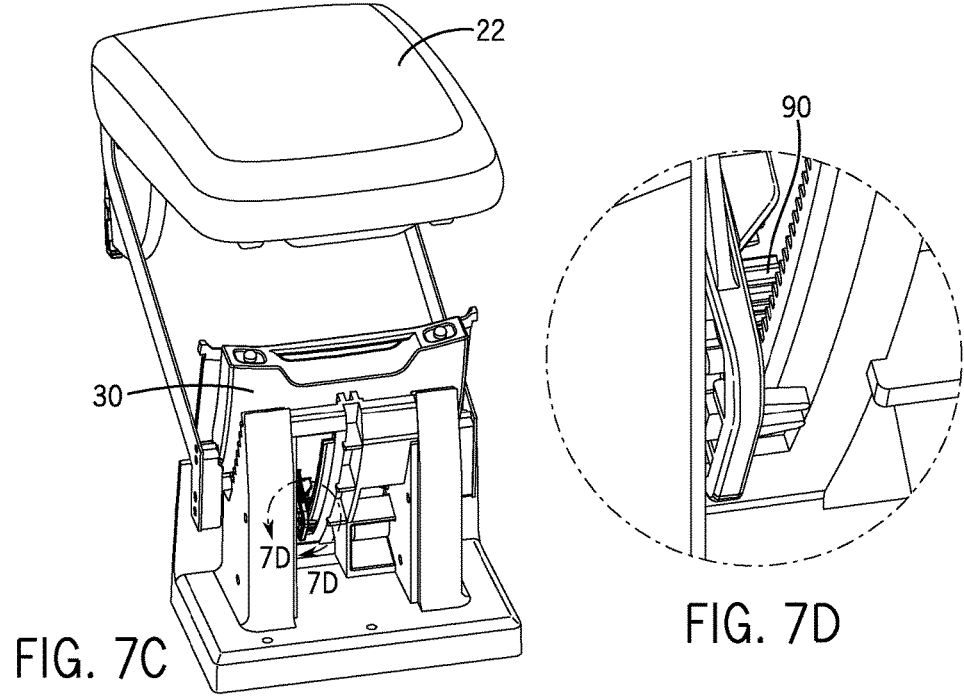
FIG. 7C is a schematic perspective view of an armrest assembly with an armrest in a raised or partially open position according to an exemplary embodiment.
FIG. 7D is a schematic detail perspective view of a portion of an armrest assembly according to an exemplary embodiment.

According to an exemplary embodiment, the armrest assembly 20 may include a base 18 (e.g., a housing) (see, e.g., FIGS. 6A to 6C). According to an exemplary embodiment, the base 18 may be part of the floor console FC and may be configured to support the armrest 22. The base 18 may include an opening 34 (e.g., a storage compartment) (see FIG. 6C) and be configured to retain various items, such as documents, glasses, and/or portable electronic devices, among other items.

According to an exemplary embodiment, the armrest assembly 20 may include an armrest 22. The armrest 22 may be configured to cover the opening 34 of the base 18 and be configured to move from a closed position (FIG. 6A), to a raised position (FIG. 6B), and to a terminal position (FIG. 6C). According to an exemplary embodiment, the armrest 22 may be configured to be moved (e.g., raised and/or lowered) to a position that facilitates driver and/or passenger comfort. The armrest 22 also may be moved to allow access to the opening 34.

According to an exemplary embodiment, movement of the armrest 22 may comprise rotation. For example, in certain embodiments, the armrest 22 may be connected to the base 18 by a joint 40 (see FIGS. 8A to 8C), such as a pivot joint provided by a rod or pin extending through portions of the armrest 22 and base 18. As shown schematically in FIGS. 8A through 8C, the joint 40 may be positioned at a first or rearward longitudinal end 42 of the armrest assembly 20 and be configured to rotatably couple the armrest 22 to a base 18. According to an exemplary embodiment, the armrest 22 may be configured to rotate about the joint 40 between a closed position (FIG. 8A), a raised position (FIGS. 8B and 8C), and a terminal position.

While a rotating armrest is described, the armrest assembly 20 may include other armrest 22 configurations. For example, certain armrest assemblies may include a rotating armrest that is configured to slide in the longitudinal direction (e.g., fore and aft) relative to the base 18. In such a configuration, the armrest may be positioned at a desired vertical position and a desired longitudinal position, to enhance passenger comfort.

According to an exemplary embodiment as shown schematically in FIG. 6B and FIGS. 8A through 8C, the armrest assembly 20 may include a mechanism 28 (e.g., an adjustment mechanism) that couples the armrest 22 to the base 18 and is configured to (a) move from a lowered position to an extended position as the armrest 22 moves from the closed position to the raised position, and (b) prevent movement of the armrest 22 from the raised position to the closed position.

Figure 3:
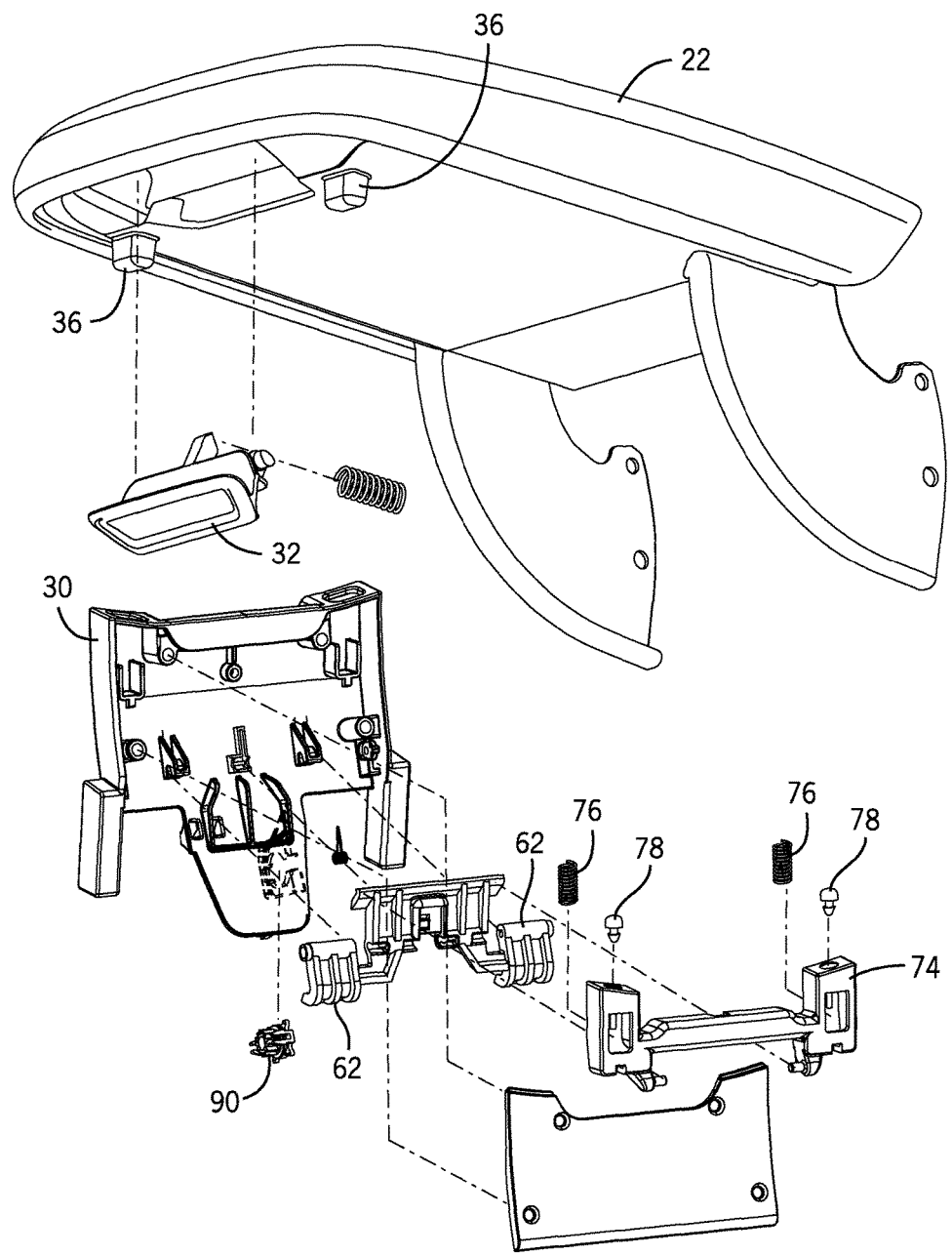
FIG. 3 is a schematic perspective exploded view of an armrest assembly according to an exemplary embodiment.
Figure 8A:
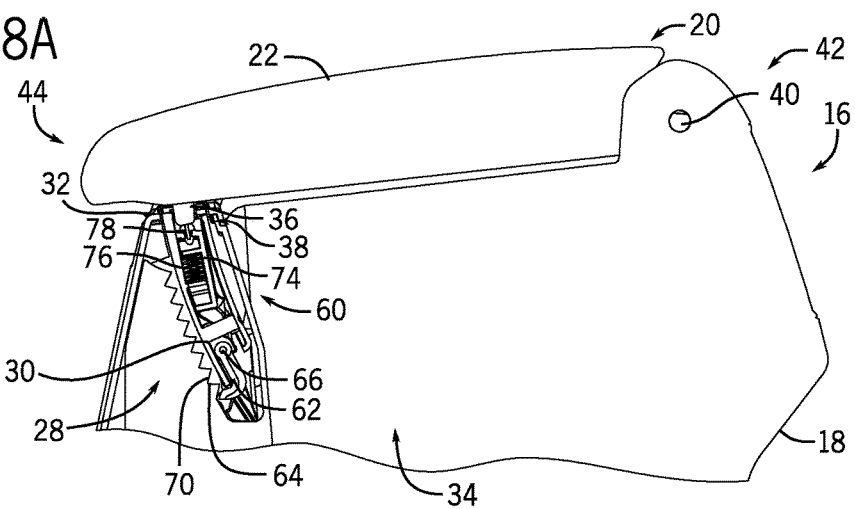
FIG. 8A is a schematic side, partial cross-sectional view of an armrest assembly taken along line 8A-8A in FIG. 6A with an armrest in a closed position according to an exemplary embodiment.
Figure 8B:
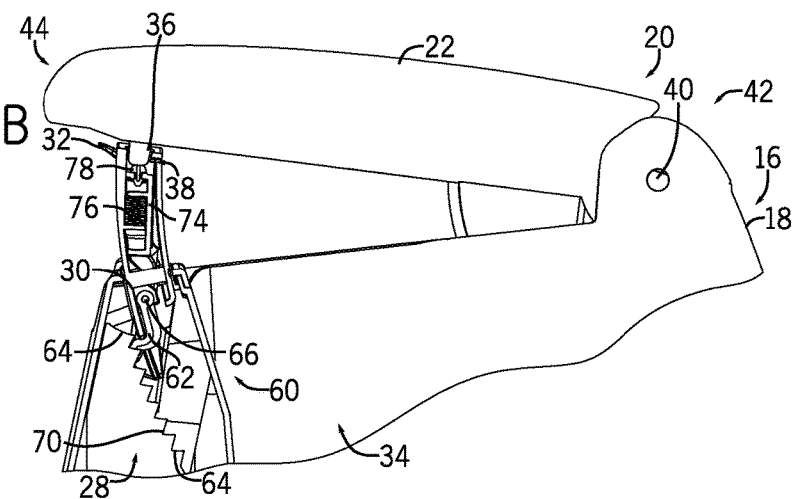
FIG. 8B is a schematic side, partial cross-sectional view of the armrest assembly taken along line 8B-8B in FIG. 6B with an armrest in a raised or partially open position according to an exemplary embodiment.
Figure 8C:
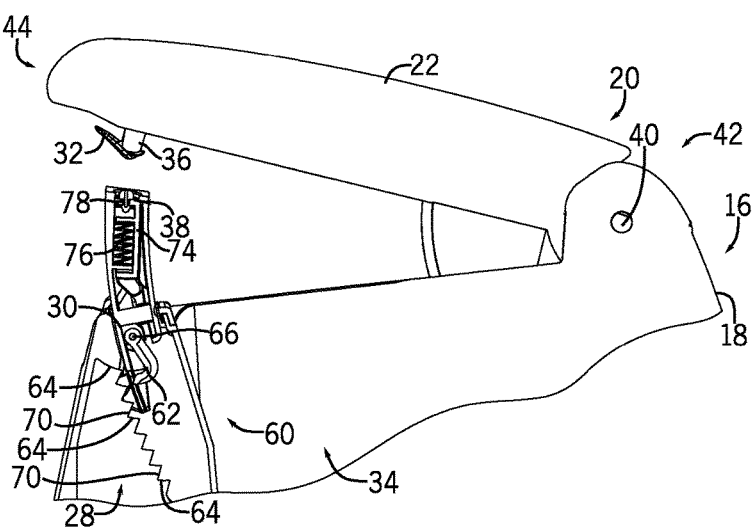
FIG. 8C is a schematic side, partial cross-sectional view of an armrest assembly with an armrest in a raised or partially open position according to an exemplary embodiment.

According to an exemplary embodiment as shown schematically in FIGS. 3 and 8B through 8C, the mechanism 28 may couple the armrest 22 to the base 18. According to an exemplary embodiment, the mechanism 28 may be directly coupled to the base 18 and be releasably coupled to the armrest 22 to establish a coupling between the armrest 22 and base 18.

According to an exemplary embodiment, the mechanism 28 may be configured to move from a lowered position (FIG. 8A) to an extended position (FIGS. 8B and 8C) as the armrest 22 moves from the closed position to the raised position. In the lowered position shown schematically in FIG. 8A, the mechanism 28 may be stored in the base 18. The mechanism 28 may be enveloped by the base 18 such that it is not visible or only partially visible to a vehicle occupant when in the lowered position. For example, when the armrest 22 is in the closed position (FIG. 8A), the mechanism 28 may be in the lowered position and stored within the base 18. According to an exemplary embodiment, the mechanism 28 may also be stored in the base when the armrest 22 is in the raised position or the terminal position and the armrest 22 is released from the mechanism 28. In the extended position shown schematically in FIGS. 8B and 8C, the mechanism 28 is shown extending from the base 18. For example, when the armrest 22 is coupled to the mechanism 28 and is moved upward to the raised position (FIG. 8B), the mechanism 28 may extend from the base 18 and follow the armrest 22.

According to an exemplary embodiment as shown schematically in FIGS. 8A through 8C, the mechanism 28 may include an adjustable support 30, which may be configured to move relative to the base 18 and with the armrest 22 while the armrest 22 is coupled to or engaged with the adjustable support 30. According to an exemplary embodiment, the adjustable support 30 may be configured to revolve about the joint 40 such that the armrest 22 and the adjustable support 30 have a common rotational axis. According to an exemplary embodiment, the armrest assembly 20 may include a support arm or arms fixedly coupled to the adjustable support 30 and rotatably coupled to the base 18 by the joint 40. The support arms may be configured to enable the adjustable support 30 to revolve about the common rotational axis between the lowered position and the extended position. In certain embodiments, the support arms may block rotation of the adjustable support 30 in the downward direction beyond the lowered position via contact with a first blocking feature of the base 18, and/or the support arms may block rotation of the adjustable support 30 in the upward direction beyond the fully extended position via contact with a second blocking feature of the base 18. According to an exemplary embodiment, the armrest assembly 20 may include more or fewer support arms. For example, in certain embodiments, the support arms may be omitted, and the adjustable support 30 may move (e.g., rotate about the rotational axis) along a track coupled to or integrated with the base 18.

According to an exemplary embodiment, the mechanism 28 may be configured to prevent movement of the armrest 22 from the raised position to the closed position and, more preferably, may be configured to hold the armrest 22 in any of a variety of desired raised positions. According to an exemplary embodiment, the armrest 22 may be moved from the closed position of FIG. 6A to the raised position of FIG. 6B, and the mechanism 28 may be configured to hold the armrest 22 in that raised position.

FIG. 3 is a schematic perspective exploded view of an exemplary embodiment of the mechanism 28. According to an exemplary embodiment as shown schematically in FIG. 3, the mechanism 28 may include the adjustable support 30, which may be configured to move relative to the base 18 between the lowered position and the extended position. According to an exemplary embodiment, the adjustable support 30 may also be configured to releasably couple to the armrest 22.

According to an exemplary embodiment as shown schematically in FIGS. 8A through 8C, an engagement mechanism 60 may be provided to block downward movement of the adjustable support 30 while the engagement mechanism 60 is activated, e.g., when the armrest 22 is coupled to the adjustable support 30. According to an exemplary embodiment as shown schematically in FIGS. 8A through 8C, the engagement mechanism 60 may include a pawl 62 that is, for example, rotatably coupled to the adjustable support 30. The pawl 62 may be configured to rotate to an engaged position (e.g., a first position) when the engagement mechanism 60 is activated and to rotate to a disengaged position (e.g., a second position) when the engagement mechanism 60 is deactivated.

According to an exemplary embodiment shown schematically in FIG. 8B, the pawl 62 may be configured to move to the engaged position to engage a blocking surface 64 of the base 18 to block downward movement of the adjustable support 30. Engagement between the pawl 62 and the blocking surface 64 may block movement of the adjustable support 30 in the downward direction to block downward movement of the armrest 22. Any number of blocking surfaces 64 may be distributed along the vertical direction to allow mechanism 28 to hold the armrest 22 in a variety of desired raised positions. According to an exemplary embodiment, a vehicle occupant may selectively determine the height of the raised position to, for example, facilitate user comfort (e.g., to accommodate passengers of different heights and/or builds).

According to an exemplary embodiment, the pawl 62 may enable the adjustable support 30 to move in the upward direction via rotation of the pawl 62. According to an exemplary embodiment as shown schematically in FIGS. 8A through 8C, the pawl 62 may be rotatably coupled to the adjustable support 30 by an axle 66. A spring, such as torsion spring or other biasing member, may urge the pawl 62 to rotate in a first rotational direction about the axle 66 to the engaged position. According to an exemplary embodiment, upon contact between the pawl 62 and contact surfaces 70 (which may be positioned between adjacent blocking surfaces 64) the pawl 62 may be driven in a second rotational direction enabling the adjustable support 30 to move in the upward direction. Upon disengagement of the pawl 62 from the respective contact surface 70, the torsion spring may drive the pawl 62 to rotate to the engaged position blocking downward movement of the adjustable support 30. Accordingly, the armrest may be held in a desired vertical position via contact between the pawl 62 and a corresponding blocking surface 64.

Figures 10A, 10B, 10C:
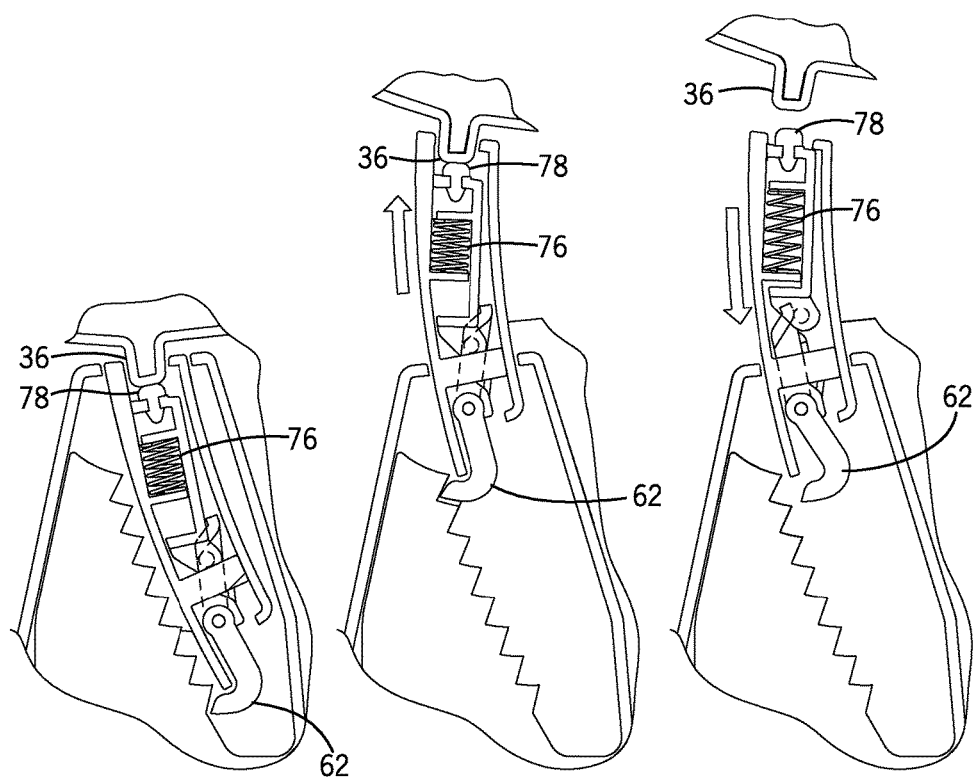
FIG. 10A is a schematic side, cross-sectional view of a mechanism of an armrest assembly with an armrest in a closed position according to an exemplary embodiment.
FIG. 10B is a schematic side, cross-sectional view of a mechanism of an armrest assembly with an armrest in a raised or partially open position according to an exemplary embodiment.
FIG. 10C is a schematic side, cross-sectional view of a mechanism of an armrest assembly with an armrest in a raised or partially open position according to an exemplary embodiment.

According to an exemplary embodiment, the engagement mechanism 60 may be configured to facilitate downward movement of the adjustable support 30 while the engagement mechanism 60 is deactivated, e.g., when the armrest 22 is released from the adjustable support 30. According to an exemplary embodiment, the adjustable support 30 of the mechanism 28 may move relative the base 18 without actuation of at least one of (a) a latching device (b) a handle, (c) a locking device. According to an exemplary embodiment shown schematically in FIGS. 8C and 10C, the pawl 62 may be configured to move to the disengaged position to disengage from the blocking surface 60, facilitating or allowing downward movement of the adjustable support 30. For example, when the pawl 62 is disengaged from the blocking surface 60, the adjustable support 30 may be free to move from the extended position to the lowered position under the force of gravity. According to an exemplary embodiment, a spring, such as a tape spring or other biasing member, may be coupled to the adjustable support 30 to bias it toward the lowered position.

According to an exemplary embodiment as shown schematically in FIGS. 8A through 8C, the engagement mechanism 60 may include a slider 74 that may control movement of the pawl 62 between the engaged position and disengaged position. According to an exemplary embodiment, the slider 74 may be configured to move between a raised position (e.g., a third position) that may block rotation of the pawl 62 from the disengaged position into the engaged position, and a lowered position (e.g., a fourth position) that may facilitate rotation of the pawl 62 from the disengaged position to the engaged position (e.g., via the torsion spring).

According to an exemplary embodiment, the pawl 62 may include contact surfaces configured to interface with respective protrusions of the slider 74. While the slider 74 is in the lowered position, each protrusion may contact a first portion of the respective contact surface, enabling the torsion spring to drive the pawl 62 to the engaged position. The protrusions may also enable the pawl 62 to rotate in the second rotational direction upon contact between the pawl 62 and a contact surface of the base 18. Upon movement of the slider 74 in the upward direction to the raised position (e.g., via a force applied by the springs 76), contact between the protrusions and a second portion of the respective contact surface may drive the pawl 62 to the disengaged position, enabling the adjustable support 30 to move to the lowered position.

While the pawl 62 is shown and described as including two contact surfaces and the slider 74 including two protrusions according to an exemplary embodiment, in alternative embodiments more or fewer contact surfaces and/or protrusions may be utilized. For example, in certain embodiments, the slider 74 may include more or less protrusions, and the pawl 62 may include a corresponding number of contact surfaces, at least one of which being configured to contact multiple protrusions.

According to an exemplary embodiment as shown schematically in FIGS. 8A through 8C, the engagement mechanism 60 may include a spring 76, such as a compression spring or other biasing member which may be configured to urge the slider 74 toward the raised position. While the illustrated engagement mechanism 60 is shown as including two springs 76, in alternative embodiments the engagement mechanism 60 may include more or fewer springs, and/or other and/or additional biasing members.

Figure 9A:
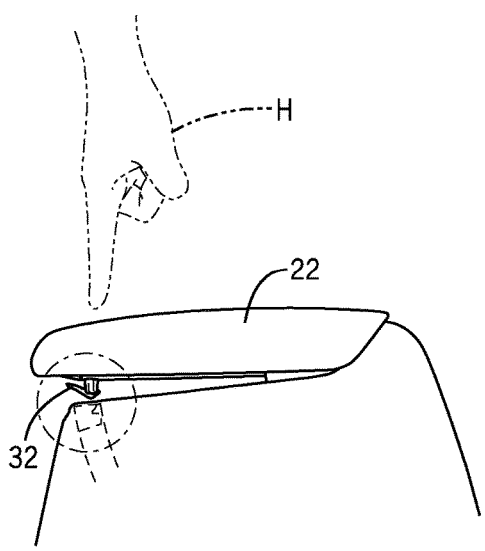
FIG. 9A is a schematic side view of an armrest assembly with an armrest in a raised or partially open position according to an exemplary embodiment.
Figure 9B:
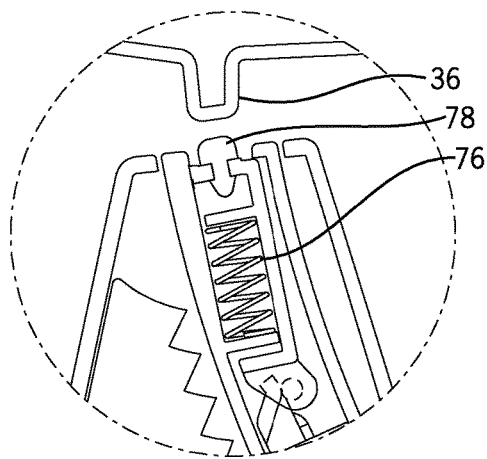
FIG. 9B is a schematic side, cross-sectional detail view of a portion of an armrest assembly according to an exemplary embodiment.
Figure 9C:
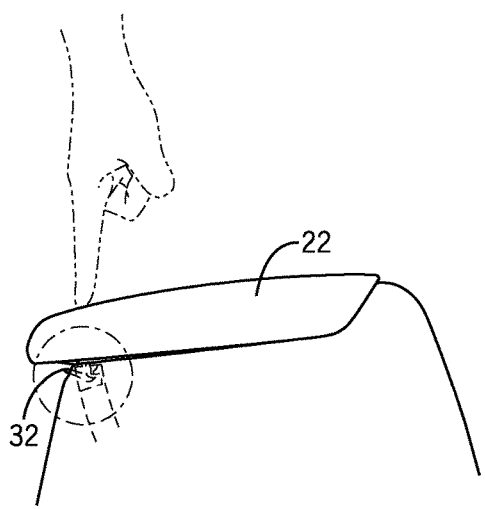
FIG. 9C is a schematic side view of an armrest assembly with an armrest in a closed position according to an exemplary embodiment.
Figure 9D:
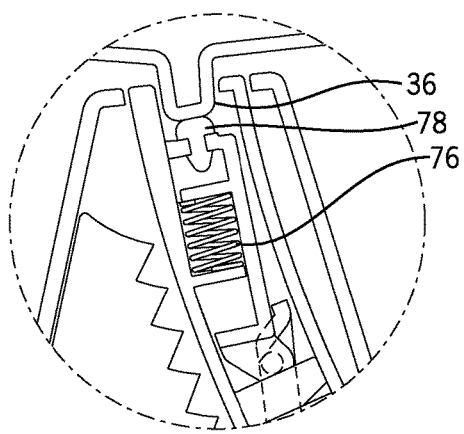
FIG. 9D is a schematic side, cross-sectional detail view of a portion of an armrest assembly according to an exemplary embodiment.
Figure 11A:
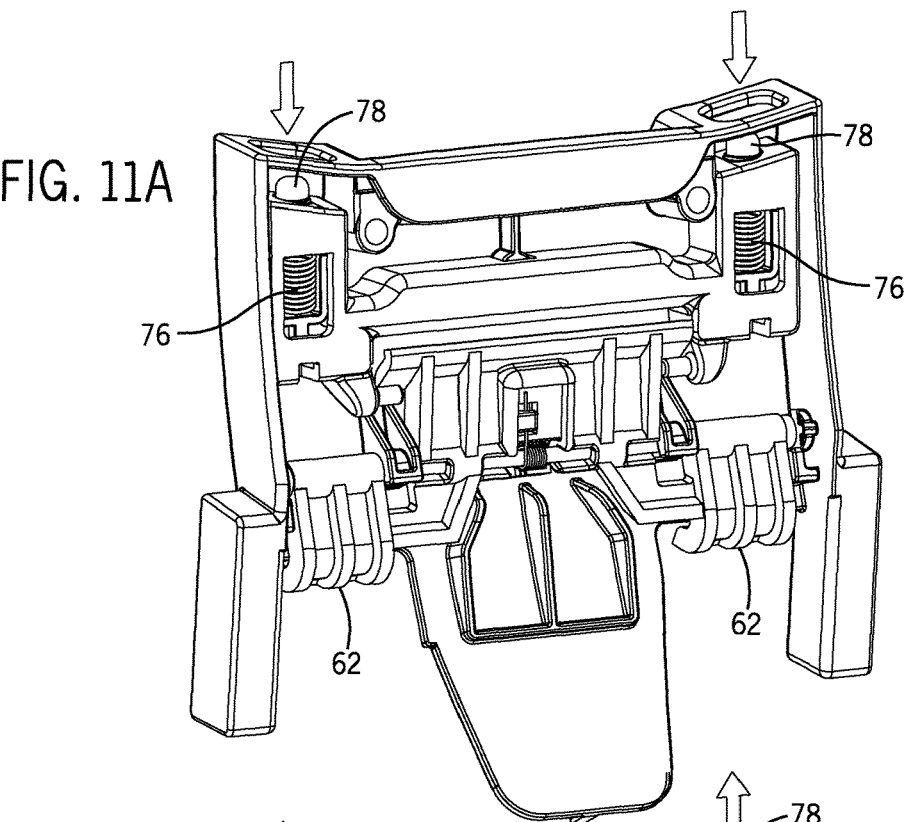
FIG. 11A is a schematic perspective view of a mechanism of an armrest assembly according to an exemplary embodiment.
Figure 11B:
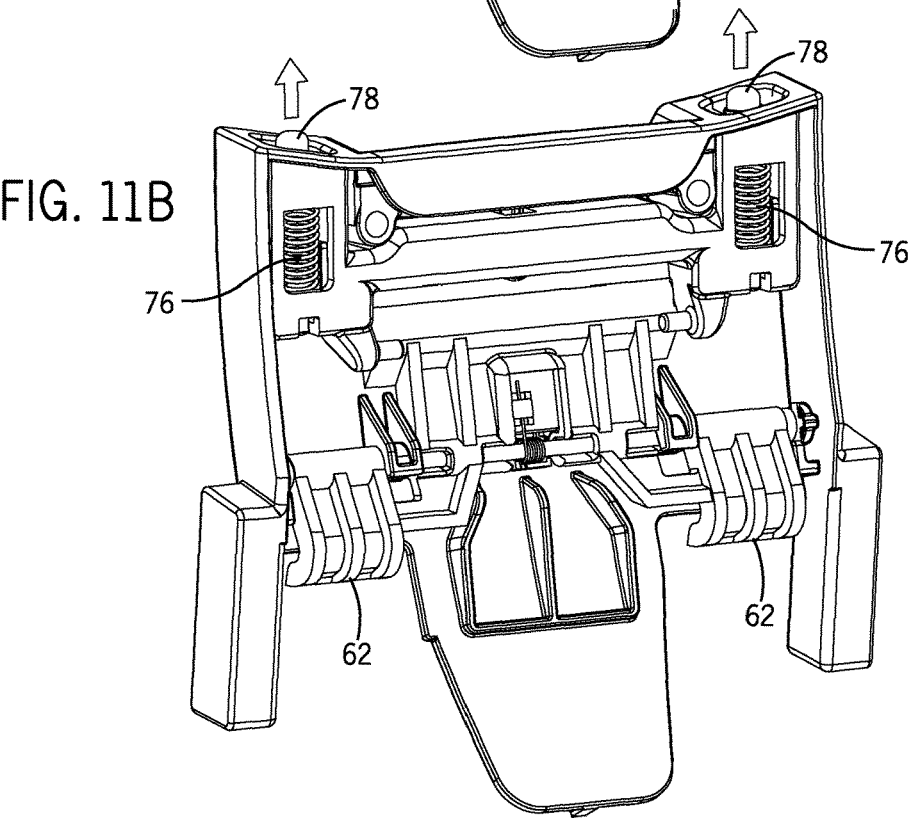
FIG. 11B is a schematic perspective view of a mechanism of an armrest assembly according to an exemplary embodiment.

According to an exemplary embodiment, when the armrest 22 is coupled to the adjustable support 30 as shown schematically in FIGS. 9A, 9B, and 11B, a protrusion 36 of the armrest 22 may be configured to drive the slider 74 against the force of the spring 76 and to the lowered position shown in FIGS. 9C, 9D, and 11A. According to an exemplary embodiment, the armrest 22 may include two protrusions 36 configured to extend into or engage two corresponding openings 38 in the adjustable support 30. While the armrest 22 is shown as including two protrusions 36 and the adjustable support 30 as including two openings 38 according to an exemplary embodiment, in alternative embodiments the armrest 22 may include more or fewer protrusions and the adjustable support 30 may include a corresponding number of openings.

According to an exemplary embodiment a shown schematically in FIG. 3 and FIGS. 8A through 8C, the slider 74 includes a bumper 78 configured to contact the protrusion 36 of the armrest. According to an exemplary embodiment, the bumper 78 may be formed from a resilient material, such as thermoplastic elastomer (TPE) and/or any other suitable elastomeric material. The bumper 78 may be configured to provide a buffer between the protrusion 36 and a body of the slider 74 while the armrest 22 is engaged with the adjustable support 30, substantially reducing or eliminating rattling between the protrusion and the slider body during operation of the vehicle. While the slider 74 is shown as including a bumper 78 according to an exemplary embodiment, in alternative embodiments the bumper may be omitted, and the protrusion may directly contact the body of the slider.

According to an exemplary embodiment as shown schematically in FIGS. 3 and 7A through 7D, the mechanism 28 may include a damper or damping member 90 configured to resist movement of the mechanism 28 from the extended position to the lowered position. According to an exemplary embodiment, the damper 90 may extend between the adjustable support 30 and the base 18. The damper 90 may be configured to damp movement of the adjustable support 30 relative to the base 18. According to an exemplary embodiment, the damper 90 may include a gear on the adjustable support 30 configured to engage a rack on the base 18. According to an exemplary embodiment, the damper 90 may be configured to resist rotation of the gear, dampening movement of the adjustable support 30 relative to the base 18.

According to an exemplary embodiment as shown schematically in FIG. 3, FIGS. 6B and 6C and FIGS. 8A through 8C, the armrest assembly 20 may include a latch 32 (e.g., a release mechanism) configured to couple the armrest 22 and the base 18 and release the armrest 22 from the base 18. According to an exemplary embodiment, when the latch 32 releases the armrest 22 from the base 18, it may allow movement of the armrest 22 from the raised position to at least one of (a) the closed position, and/or (b) a terminal position.

According to an exemplary embodiment, the latch 32 may be configured to couple or secure the armrest 22 to the adjustable support 30 of the mechanism 28 while the armrest 22 is engaged with the adjustable support 30. According to the exemplary embodiment of FIG. 3, the latch 32 may be a handle or similar structure that serves to couple the armrest 22 to the adjustable support. The latch 32 may be pivotably mounted on the armrest 22 and biased, such as by a spring, toward a coupled or latched position. The latch 32 may have a protrusion or other feature that engages with a corresponding feature on the adjustable support 30 to couple or latch the armrest 22 to the adjustable support 30. When the latch 32 is coupled to the adjustable support 30, the vehicle occupant may pull the armrest 22 upward from the closed position of FIG. 4A to the raised position of FIG. 4B. As the armrest 22 is pulled upward, the adjustable support 30 may follow due to the coupling of the latch 32. The coupling between the armrest 22 and the adjustable support 30 may also help maintain the armrest 22 in the closed position.

According to an exemplary embodiment as shown schematically in FIGS. 8A through 8C and, the latch 32 may be configured to release the armrest 22 from the base 18. For example, the latch 32 may be actuated by a vehicle occupant to cause it to move about its mount on the armrest 22 such that the protrusion or feature on the latch is disengaged from the corresponding feature on the adjustable support 30, which may facilitate disengagement of the armrest 22 from the adjustable support 30. When the vehicle occupant actuates the latch 32 (see e.g. FIG. 4D), the latch 32 may release the armrest 22 from the adjustable support 30 (see FIG. 4E), permitting the armrest 22 to move independently of and relative to the adjustable support 30 (see FIGS. 4F and 4G).

According to an exemplary embodiment as shown schematically in FIGS. 6A through 6C and FIGS. 8A through 8C, the armrest 22 may be moved to the raised position (e.g., upwardly) by engaging the armrest 22 with the adjustable support 30 and the vehicle occupant pulling upwardly on the armrest 22.

According to an exemplary embodiment as shown schematically in FIGS. 9A through 9D, FIGS. 10A through 10C, and FIGS. 11A and 11B, the armrest 22 may be in or may be moved by a vehicle occupant to the closed position. For example, the vehicle occupant may press on the armrest 22 (see FIG. 9A) to move it into the closed position (see FIGS. 9C, 9D, 10A, and 11A). In the closed position, the armrest 22 may engage the adjustable support 30, and the latch 32 may be engaged to secure the armrest 22 and the adjustable support 30 to one another. According to an exemplary embodiment, as the armrest 22 engages the adjustable support 30, the protrusion 36 may contact the bumper 78 and drive the slider 74 in the downward direction, against the bias of the spring 76, until the slider 74 reaches the lowered position. With the slider 74 in the lowered position, the spring may be allowed to drive the pawl 62 to the engaged position. With the pawl 62 in the engaged position, the pawl 62 may be positioned to contact the respective blocking surface 64 and block movement of the adjustable support 30 in the downward direction, to hold the armrest 22 in the raised position.

According to an exemplary embodiment, as the armrest 22 is pulled upwards, as shown in FIGS. 4A to 4C, the adjustable support 30 may follow due to the coupling of the armrest 22 and the adjustable support 30. As the adjustable support 30 moves upward, the pawl 62 may sequentially contact the contact surfaces (see FIGS. 10A and 10B). As the pawl 62 contacts the contact surfaces, the pawl 62 may be driven in the second rotational direction against the force of the spring to enable the adjustable support 30 to move in the upward direction. According to an exemplary embodiment, upon disengagement of the pawl 62 from the respective contact surface, the torsion spring may drive the pawl 62 to rotate to the engaged position to engage the respective blocking surface and block downward movement of the adjustable support 30. The armrest 22 may be held in a desired vertical position associated with a corresponding blocking surface.

According to an exemplary embodiment as shown schematically in FIGS. 4A through 4G, the armrest 22 may be raised in the upward direction until a desired vertical position is reached. With the engagement mechanism 60 activated, the engagement mechanism 60 may block downward movement of the adjustable support 30 from a position corresponding to the desired vertical position of the armrest 22. For example, according to an exemplary embodiment, downward movement of the adjustable support 30 may be blocked by contact between a portion of the engagement mechanism 60 and one of a number of contact surfaces of the base 18. As a result, downward movement of the armrest 22 from the desired vertical position may be blocked by contact with the adjustable support 30, to hold the armrest in the desired vertical position.

Figure 5A:
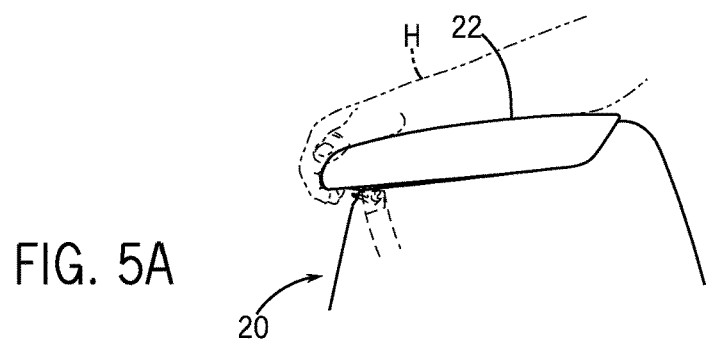
FIG. 5A is a schematic side view of an armrest assembly with an armrest in a closed position according to an exemplary embodiment.
Figure 5B:
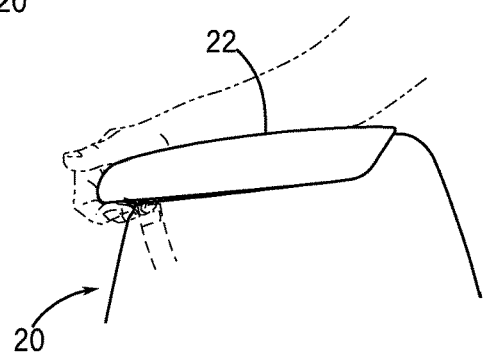
FIG. 5B is a schematic side view of an armrest assembly with an armrest in a closed position according to an exemplary embodiment.
Figure 5C:
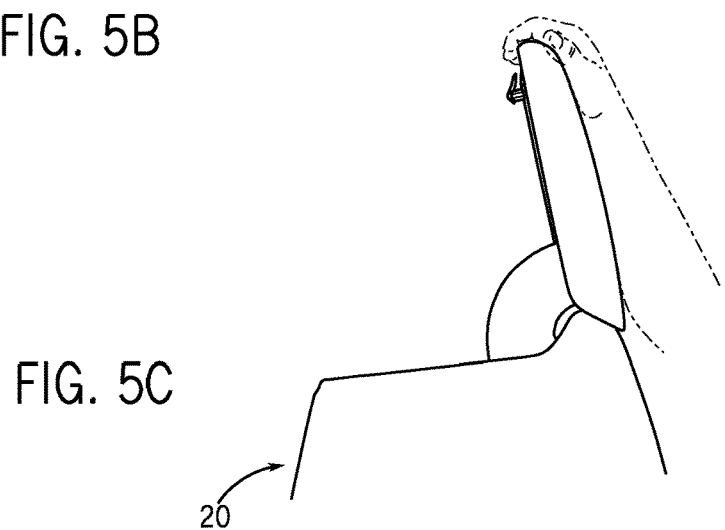
FIG. 5C is a schematic side view of an armrest assembly with an armrest in a terminal or fully open position according to an exemplary embodiment.
Figure 5D:
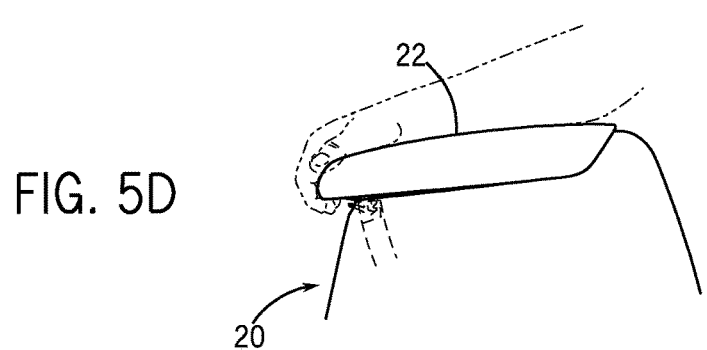
FIG. 5D is a schematic side view of an armrest assembly with an armrest in a closed position according to an exemplary embodiment.

According to an exemplary embodiment as shown schematically in FIGS. 4E though 4G, the armrest 22 may be moved to the raised position (e.g., upwardly) or to the terminal position independent of the adjustable support 30. As shown schematically in FIGS. 4D and 4E, the latch 32 may be actuated by a hand of a vehicle occupant to release the armrest 22 from the adjustable support 30. The vehicle occupant may then be free to move the armrest 22 to a desired position, such as the raised position or the terminal position (see also FIGS. 5A through 5C).

According to an exemplary embodiment, the armrest 22 may be free to move from the closed position to the raised position without actuation of at least one of (a) a latching device (b) a handle, (c) a locking device.

According to an exemplary embodiment as shown schematically in FIGS. 4E and 4F, when the armrest 22 is in the raised position and is released from the base 18, the mechanism may be configured to move from the extended position to the lowered position. According to an exemplary embodiment, a vehicle occupant may disengage the latch 32, to release the armrest 22 from the adjustable support 30 of the mechanism 28. Biasing members may be used to urge the armrest 22 and the adjustable support 30 away from one another once the armrest 22 is released from the adjustable support 30. The armrest 22 may disengage from the adjustable support 30 to deactivate the engagement mechanism 60. In particular, the spring 76 may drive the slider 74 in the upward direction, driving the protrusion 36 to disengage the slider 74. As the slider 74 moves toward the raised position, contact between the slider 74 and the pawl 62 may drive the pawl 62 in the second rotational direction, against the bias of the torsion spring, toward the disengaged position. With the pawl 62 in the disengaged position, the pawl 62 may disengage the respective contact surface 64, and the adjustable support 30 may move in the downward direction (e.g., via the force of gravity, via a force applied by a biasing member, etc.) to the lowered position.

According to an exemplary embodiment, by releasing the armrest 22 from the adjustable support 30 (and the base 18), the armrest 22 may be allowed to move from the closed position and/or the raised position to another position, such as at least one of the closed position, the raised position, and the terminal position. For example, once the armrest 22 is released from the adjustable support 30 (FIG. 4D), the armrest 22 may be rotated in an upward direction to another raised position (FIG. 4F) or the terminal position (FIG. 4G) to facilitate access to the opening 34. With the adjustable support 30 in the lowered position, the armrest 22 may be rotated in the downward direction to the lowered position (FIG. 4H).

According to an exemplary embodiment as shown schematically in FIGS. 8A through 8C, joint 40 and the mechanism 28 positioned at opposite longitudinal ends of the armrest assembly 20 may facilitate reduced structural loading on the joint 40 and/or mechanism 28. According to an exemplary embodiment shown schematically in FIG. 8A, the joint 40 may be positioned at the first or rearward longitudinal end 42 of the armrest assembly 20 and the mechanism 28 may be positioned at a second or forward longitudinal end 44 of the armrest assembly 20. The mechanism 28 may be configured to support and hold the armrest 22 in one of a number of vertical positions including the lowered position and the extended position. Because the joint 40 and the mechanism 28 may be positioned at opposite longitudinal ends of the armrest assembly 20, the mechanism 28 may be subjected to less loading (e.g., torque) than a mechanism integrated within or coupled to the joint. The loading of the joint 40 may also be reduced. Accordingly, according to an exemplary embodiment, the mechanism and/or the joint may be constructed from lighter and/or less expensive materials than known armrest assemblies, to reduce vehicle weight and/or manufacturing costs.

According to an exemplary embodiment, the armrest may be configured to operate with a single latch system which may provide ease of use. For example, achieving the closed position of the armrest may merely require using the latch to release the armrest from the mechanism, which also provides ease of use. As yet another example, the motion of the armrest may be dampened, which enhances the user experience. As yet another example, the armrest height may be adjusted merely by a vehicle occupant pulling on the armrest, which also provides ease of use. As yet another example, the design of the armrest assembly may allow for enhanced styling.

According to an exemplary embodiment as shown schematically in FIGS. 8A through 8C, an armrest assembly 20 may include an armrest 22 and a pivot joint 40. The pivot joint 40 may be configured to rotatably couple the armrest 22 to a housing of a vehicle interior component, and the armrest 22 may be configured to rotate about the pivot joint 40 between a lowered position and a raised position. The armrest assembly 20 may also include an adjustment mechanism 28 having an adjustable support 30 and an engagement mechanism 60 coupled to the adjustable support 30. The adjustable support 30 may be configured to block downward movement of the armrest 22 via contact with the armrest 22, the engagement mechanism 60 may be configured to block downward movement of the adjustable support 30 while the engagement mechanism 60 is activated and may facilitate downward movement of the adjustable support 30 while the engagement mechanism 60 is deactivated, and the engagement mechanism 60 may be configured to activate upon engagement of the armrest 22 with the adjustable support 30 and to deactivate upon disengagement of the armrest 22 from the adjustable support 30.

According to an exemplary embodiment as shown schematically in FIGS. 8A through 8C, an armrest assembly 20 comprises: an armrest 22; a pivot joint 40 positioned at a first longitudinal end of the armrest assembly 20, wherein the pivot joint 40 may be configured to rotatably couple the armrest 22 to a housing of a vehicle interior component, and the armrest 22 may be configured to rotate about the pivot joint 40 between a lowered position and a raised position; and an adjustment mechanism 28 positioned at a second longitudinal end of the armrest assembly 20, opposite the first longitudinal end, wherein the adjustment mechanism 28 may comprise an adjustable support 30 and an engagement mechanism 60 coupled to the adjustable support 30, the adjustable support 30 may be configured to block downward movement of the armrest 22 via contact with the armrest 22, the engagement mechanism 60 may be configured to block downward movement of the adjustable support 30 while the engagement mechanism 60 is activated and to facilitate downward movement of the adjustable support 30 while the engagement mechanism 60 is deactivated, and the engagement mechanism 60 may be configured to activate upon engagement of the armrest 22 with the adjustable support 30 and to deactivate upon disengagement of the armrest 22 from the adjustable support 30.

According to an exemplary embodiment as show schematically in FIGS. 8A through 8C, the armrest assembly 20 may comprise a support arm fixedly coupled to the adjustable support 30 and configured to be rotatably coupled to the housing by the pivot joint 40, wherein the adjustable support 30 may be configured to rotate about the pivot joint 40 between a lowered position and a raised position.

According to an exemplary embodiment as show schematically in FIGS. 8A through 8C, in the armrest assembly 20, the engagement mechanism 30 may comprise a rotatable pawl 62, the rotatable pawl 62 may be configured to rotate to a first position upon activation of the engagement mechanism 60 and to rotate to a second position upon deactivation of the engagement mechanism 60, the rotatable pawl 62 may be configured to engage a blocking surface of the housing while in the first position to block downward movement of the adjustable support 30, and the rotatable pawl 62 is configured to disengage the blocking surface while in the second position to facilitate downward movement of the adjustable support.

According to an exemplary embodiment as show schematically in FIGS. 8A through 8C, in the armrest assembly, the engagement mechanism 60 may comprise a first biasing member configured to urge the rotatable pawl toward the first position.

According to an exemplary embodiment as show schematically in FIGS. 8A through 8C, in the armrest assembly, the engagement mechanism 60 may comprise a slider 74 configured to move between a third position that blocks rotation of the rotatable pawl 62 from the second position to the first position, and a fourth position that facilitates rotation of the rotatable pawl 62 from the second position to the first position, and wherein the armrest 22 comprises a protrusion configured to drive the slider 74 to the fourth position while the armrest is engaged with the adjustable support 30.

According to an exemplary embodiment as show schematically in FIGS. 8A through 8C, in the armrest assembly 20, the engagement mechanism 60 may comprise a second biasing member configured to urge the slider toward the third position.

According to an exemplary embodiment as show schematically in FIGS. 8A through 8C, in the armrest assembly 20, the slider 74 may comprise a bumper 78 configured to contact the protrusion of the armrest 22.

According to an exemplary embodiment as show schematically in FIGS. 8A through 8C, the armrest assembly 20 comprises a release mechanism coupled to the armrest 22, wherein the release mechanism may be configured to secure the armrest 22 to the adjustable support 30 while the armrest 22 is engaged with the adjustable support 30, and the release mechanism is configured to release the armrest 22 from the adjustable support 30 to facilitate disengagement of the armrest 22 from the adjustable support.

According to an exemplary embodiment as show schematically in FIGS. 8A through 8C, in the armrest assembly 20, the adjustment mechanism 28 may comprise a biasing member extending between the adjustable support 30 and the housing, wherein the biasing member is configured to urge the adjustable support 30 toward a lowered position.

According to an exemplary embodiment as show schematically in FIGS. 7A through 7D, in the armrest assembly 20, the adjustment mechanism 28 may comprise a damping member 90 extending between the adjustable support 30 and the housing, wherein the damping member 90 may be configured to damp movement of the adjustable support relative to the housing.

While certain mechanisms (e.g., hinges, offset pivots, linkage assemblies) to facilitate moving the movable doors or armrest portions between open and closed positions are disclosed, the disclosed exemplary embodiments may include any suitable mechanism configured to independently move the movable doors or armrest portions between the closed position 32 in which the corresponding compartment is substantially covered and the open position 50 in which the corresponding opening 34 is substantially uncovered. Additionally, the various features of the disclosed exemplary embodiments may be combined in any suitable manner.

While only certain features and exemplary embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative exemplary embodiments. It is, therefore, to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). In the development of any such actual implementation, as in any engineering or design project, numerous implementation specific decisions may be made. Such a development effort might be complex and time consuming, but would be a routine undertaking of design, fabrication, and manufacture for those of ordinary skill having the benefit of this disclosure, without undue experimentation.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions may comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. An armrest assembly for a vehicle interior comprising:
   (a) a base comprising an opening;
   (b) an armrest configured to move to (1) a closed position to cover the opening of the base and (2) a raised position and (3) an open position; and
   (c) a mechanism configured to move the armrest from the closed position to the raised position;
   wherein the mechanism comprises an adjustable support and a pawl;
   wherein the pawl is configured to block movement of the adjustable support to prevent movement of the armrest from the raised position to the closed position;
   wherein the adjustable support is configured to move from an extended position to a retracted position to prevent movement of the armrest from the open position to the raised position.

2. The armrest assembly of claim 1 wherein the pawl is configured to rotate relative to the adjustable support to enable movement of the armrest from the closed position to the raised position.

3. The armrest assembly of claim 1 wherein the armrest is decoupled from the adjustable support in the open position.

4. The armrest assembly of claim 1 wherein the armrest is configured to rotate about a pivot from the closed position to the raised position; wherein the armrest is configured to rotate about the pivot from the raised position to the open position.

5. The armrest assembly of claim 1 wherein the adjustable support is configured to couple the armrest to the base.

6. The armrest assembly of claim 1 wherein the armrest is configured to move from the closed position to the open position through the raised position.

7. The armrest assembly of claim 1 wherein the adjustable support is configured to prevent movement of the armrest from the raised position to the closed position.

8. The armrest assembly of claim 7 further comprising a latch configured to allow movement of the armrest from the raised position to the closed position.

9. The armrest assembly of claim 1 wherein the base comprises the mechanism.

10. The armrest assembly of claim 1 wherein the mechanism is (a) stored in the base when the armrest is in the closed position and when the armrest is in the open position and (b) extends from the base when the armrest is in the raised position.

11. An armrest assembly for a vehicle interior comprising:
    (a) a base comprising an opening;
    (b) an armrest configured to move to (1) a closed position to cover the opening of the base and (2) a raised position and (3) an open position;
    (c) a mechanism configured to move the armrest from the closed position to the raised position; and
    (d) a latch configured to secure the armrest to the mechanism;
    wherein the mechanism comprises an adjustable support;
    wherein the adjustable support is configured to move from a lowered position to an extended position to move the armrest from the closed position to the raised position;
    wherein the adjustable support is configured to move from the extended position to the lowered position in response to disengagement of the armrest and the adjustable support at the latch.

12. The armrest assembly of claim 11 wherein the armrest is configured to rotate about a pivot from the closed position to the raised position; wherein the armrest is configured to rotate about the pivot from the raised position to the open position.

13. The armrest assembly of claim 11 wherein the armrest is decoupled from the mechanism in the open position.

14. The armrest assembly of claim 11 wherein the mechanism is configured to couple the armrest to the base.

15. The armrest assembly of claim 11 wherein the mechanism comprises a damper configured to resist movement of the adjustable support from the extended position to the lowered position.

16. The armrest assembly of claim 11 wherein the mechanism comprises (a) a pawl configured to engage the base to prevent movement of the armrest from the raised position to the closed position and disengage the base to allow movement of the armrest from the raised position to the closed position and (b) a slider configured to block movement of the pawl.

17. An armrest assembly for a vehicle interior comprising:
    (a) a base comprising an opening;
    (b) an armrest configured to move to (1) a closed position to cover the opening of the base and (2) a raised position and (3) an open position;
    (c) a mechanism configured to move the armrest from the closed position to the raised position; and
    (d) a latch configured to prevent movement of the armrest to the open position;
    wherein the mechanism comprises a support configured to prevent movement of the armrest from the raised position to the closed position;

wherein the support is configured to move relative to the base to allow movement of the armrest from the raised position to the closed position in response to actuation of the latch.

18. The armrest assembly of claim 17 wherein the mechanism is configured to move from an extended position to a lowered position to prevent movement of the armrest from the open position to the raised position.

19. The armrest assembly of claim 17 wherein the latch is configured to selectively couple the armrest and the mechanism.

20. The armrest assembly of claim 17 wherein the armrest is configured to rotate about a pivot from the closed position to the raised position; wherein the armrest is configured to rotate about the pivot from the raised position to the open position.

21. The armrest assembly of claim 17 wherein the mechanism is configured to couple the armrest to the base when the armrest is in the closed position and the raised position.

* * * * *